Feb. 14, 1933.                M. J. FARRELL ET AL                1,897,894
                                 AIR BRAKE SYSTEM
                            Filed Nov. 7, 1930          4 Sheets-Sheet 1
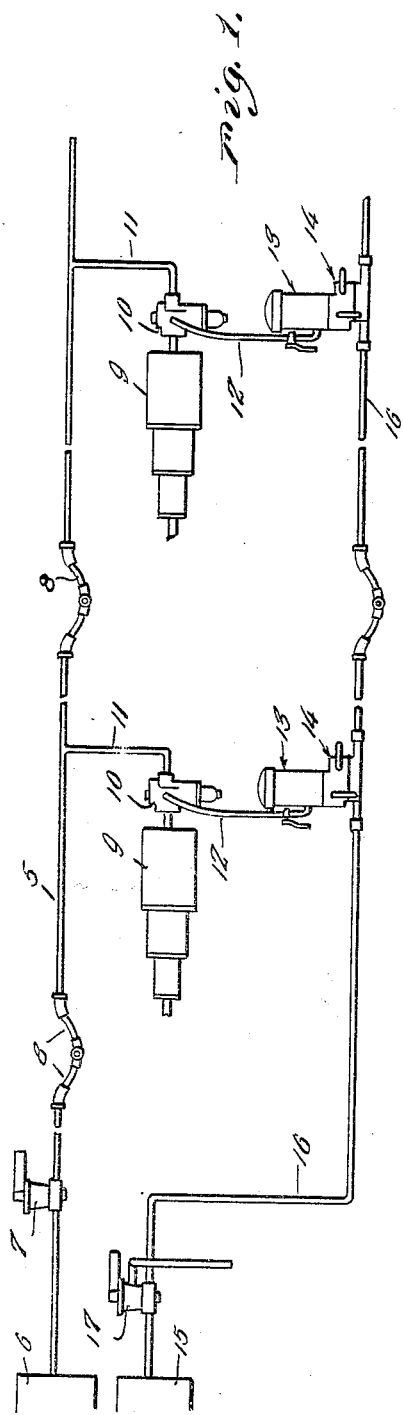
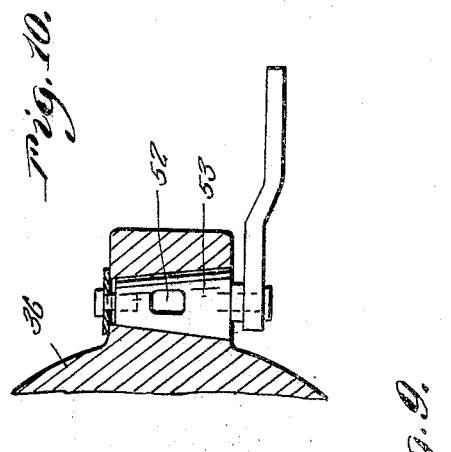
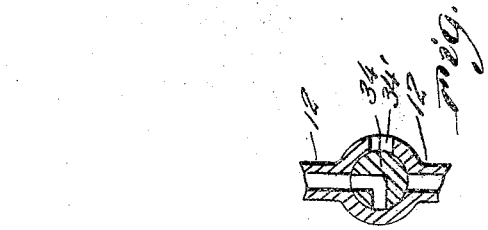
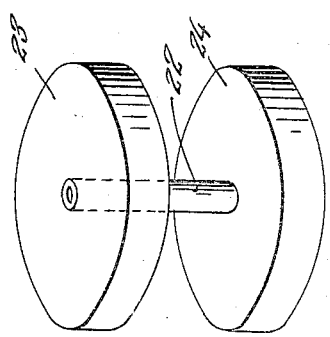
Inventors
M. J. Farrell
Lally Staffaroni
By Clarence A. O'Brien
                Attorney

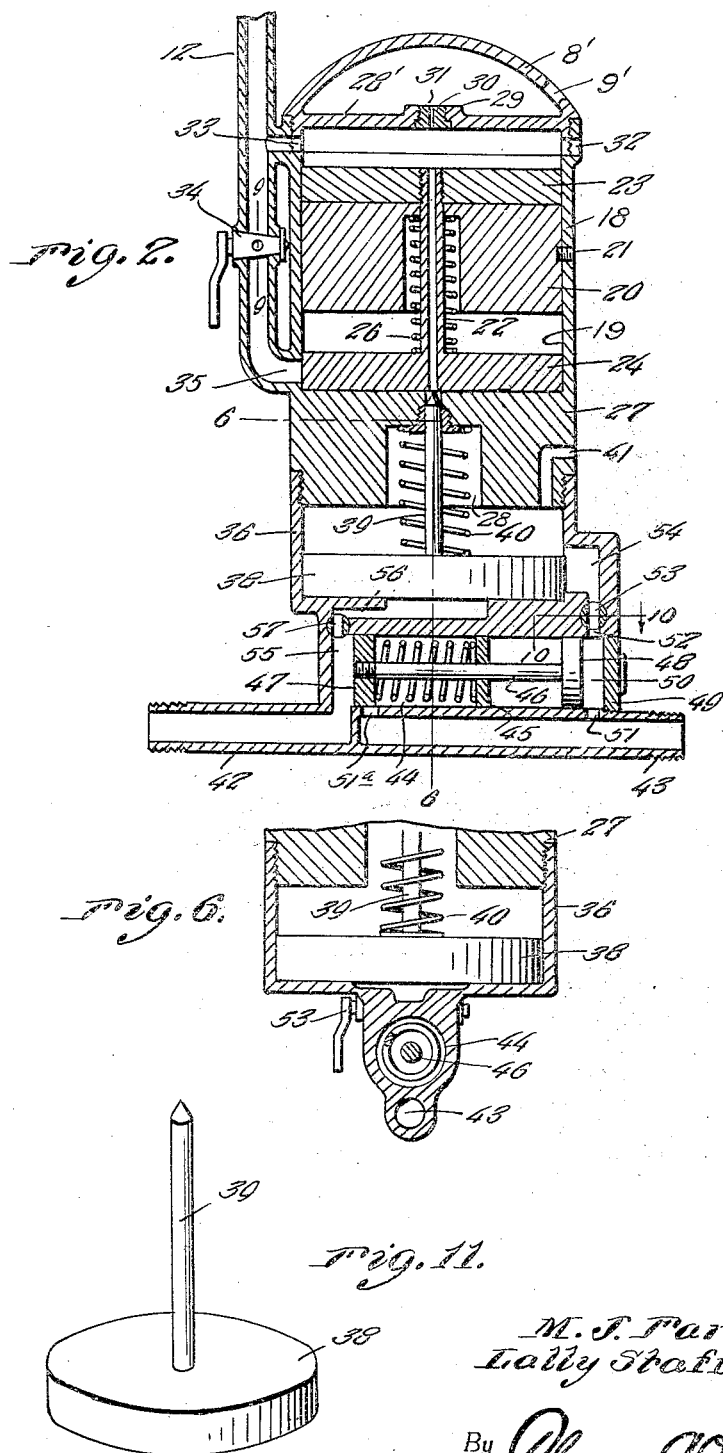

Feb. 14, 1933.  M. J. FARRELL ET AL  1,897,894
AIR BRAKE SYSTEM
Filed Nov. 7, 1930  4 Sheets-Sheet 3
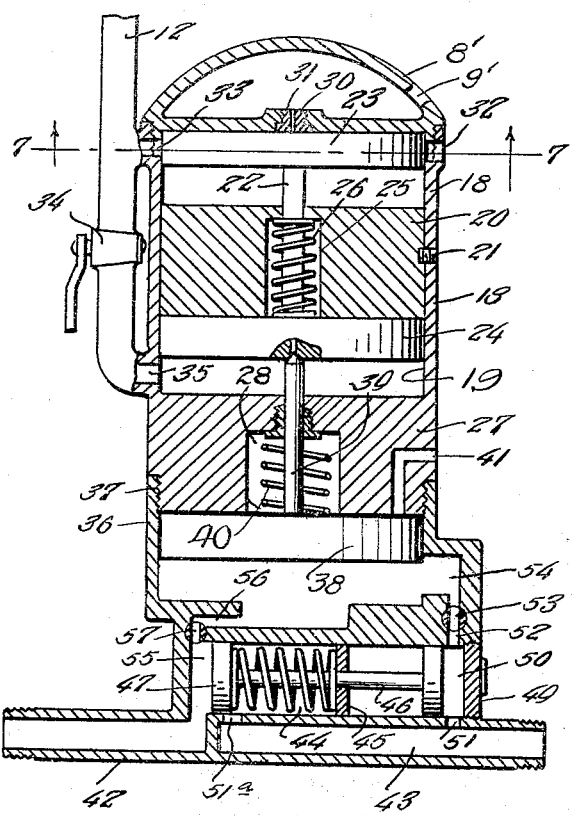
Fig. 5.
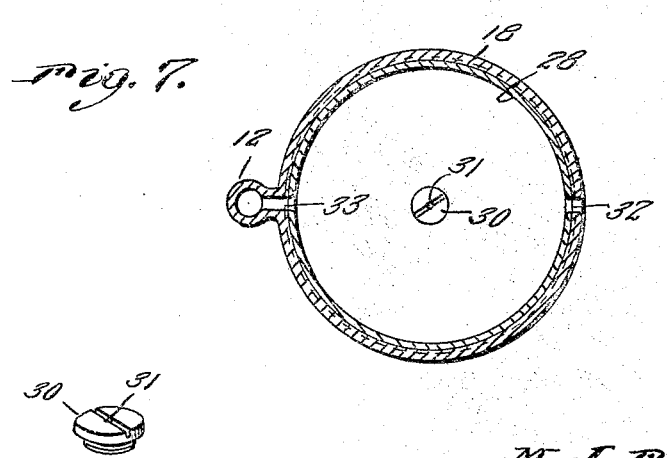
Fig. 7.
Fig. 13.
Inventors
M. J. Farrell
Lally Staffaroni
By Clarence A. O'Brien
Attorney

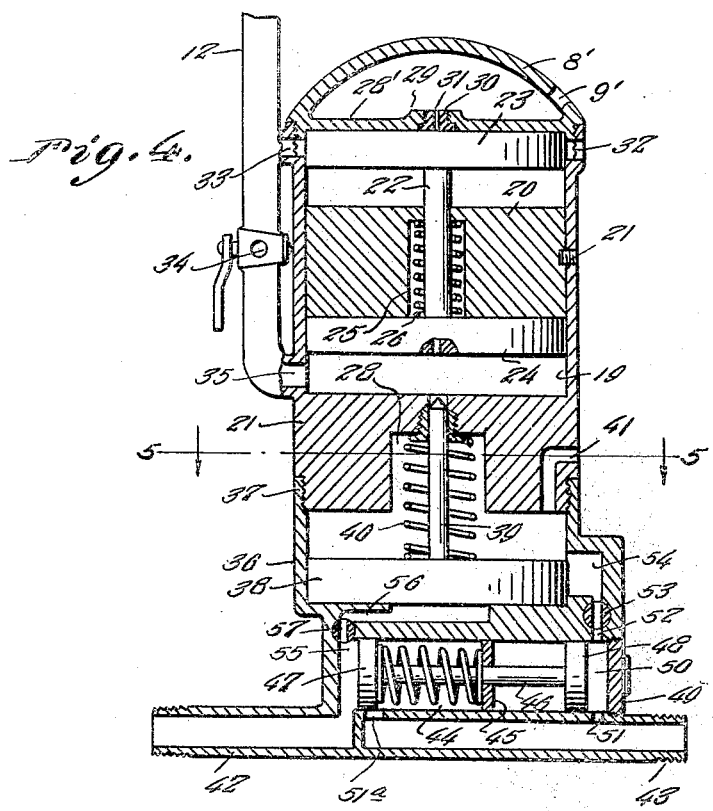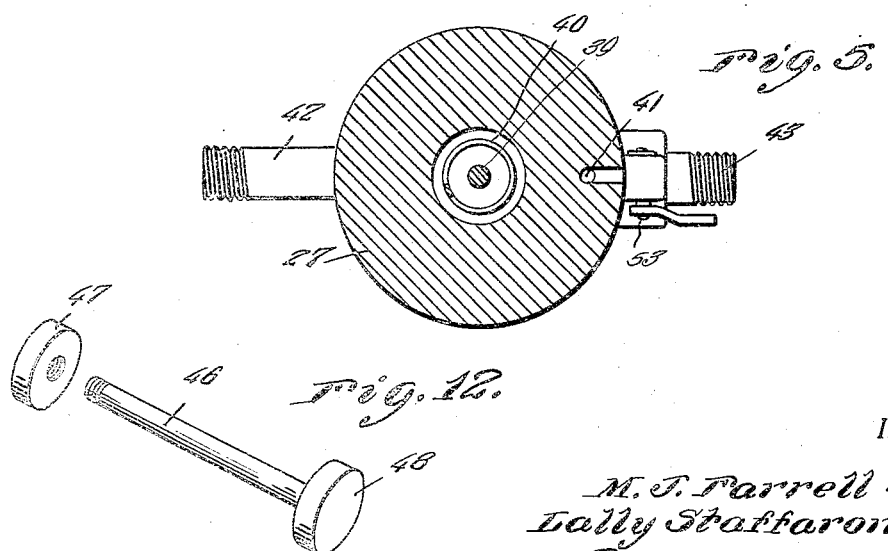

Patented Feb. 14, 1933

1,897,894

UNITED STATES PATENT OFFICE

MICHAEL J. FARRELL AND LALLY STAFFARONI, OF SCRANTON, PENNSYLVANIA

AIR BRAKE SYSTEM

Application filed November 7, 1930. Serial No. 494,134.

This invention appertains to new and useful improvements in air brake systems, for railway rolling stock, and the same has as its principal object the provision of means whereby the air released through the usual triple valve from the air brake cylinder can be retarded to delay the releasement of the brake.

Another important object of the invention is to provide brake release delaying means operative by the engineer from the cab of the locomotive as a substitute for the present-day practice of requiring train men to travel upon the cars to manually set the retaining valves to accomplish the result performed automatically by this invention.

Still another important object of the invention is to provide an air brake system for railway rolling stock wherein the air air brake may be released successively from the tail car forwardly.

These and numerous other important objects and advantages of the invention will readily become apparent to the reader of the following specification and claims.

In the drawings:—

Figure 1 represents a fragmentary diagrammatic view of the system.

Fig. 2 represents a vertical sectional view through the retaining valve with its parts in position permitting the air to directly pass to the atmosphere.

Fig. 3 represents a vertical sectional view through the novel retaining valve showing the parts in position retaining air.

Fig. 4 represents a vertical sectional view through the novel retaining valve showing the parts in position for releasing the air gradually after retention.

Fig. 5 represents a horizontal sectional view taken substantially on the line 5—5 of Fig. 4.

Fig. 6 represents a fragmentary detailed sectional view taken substantially on the line 6—6 of Fig. 2.

Fig. 7 represents a horizontal sectional view taken substantially on the line 7—7 of Fig. 3.

Fig. 8 represents a perspective view of the double valve unit.

Fig. 9 represents a fragmentary sectional view taken substantially on the line 9—9 of Fig. 2.

Fig. 10 represents a fragmentary sectional view taken substantially on the line 10—10 of Fig. 2.

Fig. 11 represents a perspective view of the examination needle and piston valve unit.

Fig. 12 represents a perspective view of the safety valve element.

Fig. 13 represents a perspective view of the apertured air outlet of plug.

Referring to the drawings wherein like numerals designate like parts, it can be seen that Fig. 1 represents the novel system in which numeral 5 represents the usual air brake line extending from a supply 6 through the usual engineer's control valve 7, the line being in section with the hose couplings 8 between the cars of the train. As is also shown, numeral 9 represents the usual air brake cylinder, each with a triple valve 10 in communication therewith.

A pipe 11 communicates each of the triple valves 10 with the air brake line 5, and also as shown in Fig. 1, a pipe 12 extends from the usual exhaust opening of the triple valve to the novel retaining valve generally referred to by numeral 13. The retaining valve 13 includes a safety valve generally referred to by numeral 14, and these safety valves are communicated with each other and with an air supply source 15 by way of the pipe line 16. In the cab of the locomotive is a control valve 17 whereby air may be supplied along the pipe line 16 to the various retaining valves. The construction of the retaining valve and its valve 14 will now be described in detail.

Reference is made to Figs. 2, 3 and 4, in particular. It can be seen that the safety valve includes a cylinder block 18 with a bore 19 therein. Fixed within the bore 19 and intermediate the ends thereof is the body 20 secured by suitable means 21 to the block 18 and being provided with a bore therethrough for slidably receiving the tube 22, which has the upper and lower valve pistons 23 and 24 secured to the corresponding ends thereof.

A counter-bore 25 extends upwardly from the bottom of the body 20 for receiving the compressible spring 26 which is interposed between the lower piston 24 and the body 20 at the upper end of the counter-bore 25.

The lower end of the block 18 is solid as denoted by numeral 27 and has a counterbore 28 therein. The upper end of the block 18 is closed as at 28′, and provided with a thickened metal portion 29, threadedly bored to receive the apertured plug 30, the aperture being denoted by numeral 31.

This plug is preferably key-slotted so as to be engaged by a screw driver. Numeral 32 represents the normal air exhaust opening in the side wall of the block 18 adjacent the upper end thereof, while numeral 33 represents the opposed inlet opening which communicates with the aforementioned pipe 12 which extends from the triple valve.

A manually controlled valve 34 is located in the pipe 12 between the inlet opening 33 and the inlet opening 35 which is formed in the cylinder block 18 at the lower end of the bore 19.

As shown in Fig. 9, this valve in normal position opens communication between the upper part of the pipe 12 and the lower part thereof, but when desired by turning this valve a quarter turn, the pipe 12 will be open to the atmosphere through the port 34′ of the casing of said valve. This will render the device inoperative so that the brake system will operate in the usual manner.

A casting 36 has its upper portion hollow and of cylindrical shape and threadedly connected to the solid portion 27 of the cylinder block as at 37. Operative within this portion of the casting 36 is the piston valve 38 carrying the needle valve 39 extending upwardly from the piston 38 and in alinement with the duct through the tube 22. This needle valve passes through a packing gland 39′. A compressible coiled spring 40 is interposed between the top of the piston 38 and a wall of the counter-bore 28 and convolutes the needle valve 39 in the manner shown in Fig. 4. An outlet duct 41 extends from the bottom of the solid portion 27 of the cylinder block through the side thereof to the atmosphere.

Extending in opposite directions laterally from the lower portion of the casing 36 are the tubular extensions 42 and 43, each being connectible at its outer end to the aforementioned auxiliary air supply line 16. The portion of the casting 36 above the extensions 42 and 43 is bored to provide a cylinder 44 having a guide 45 therein through which the rod 46 is slidable. This rod is provided with a valve 47 on one end, and a valve 48 on its opposite end. The cylinder 44 is closed by the plug 49 at one end thereof, and plug 49 and the valve 48 from a by-pass 50 which communicates at one end through the opening 51 with the tubular extension 43 and at its opposite end by way of the duct 52 and valve 53 with pocket or chamber 54 which is in communication with the chamber in which the piston valve 38 is operative.

Between the valve 47 and the adjacent wall of the casting 36 is a by-pass 55 having one end connected with the tubular extension 42 and its other end connected with the compartment in which the piston valve 38 is operative, by way of the duct 56 and manual valve 57.

It can now be seen that as the brakes are released, air escapes from triple valve 10 from the air brake cylinders. Ordinarily, the air escapes very rapidly to the atmosphere, resulting in the quick releasement of the brakes. As this in many ways is hazardous and has caused the installation of various types of air manual operation, it is the purpose of this invention to retard or delay the escapement of this air by passing the same through a novel form of retaining valve which is operative by the engineer in his cab.

Therefore, it can be seen that ordinarily when the mechanism of the retaining valve is in the position shown in Fig. 2, air from the triple valve will pass through the pipe 12 through the inlet 33 and out through the outlet 32.

However, if the engineer wishes to delay the releasement of his brakes, the pipe line 16 is charged with air by opening the valve 17. The air passes through the extension 42, passageway 55, duct 56 and exerts itself against the piston valve 38, lifting the valve upwardly as in the manner shown in Fig. 3, the needle valve 39 closing the duct through the tube 22 and causing the valves 23 and 24 to assume the positions shown in Fig. 3, closing the inlet and outlet ports 33 and 32 respectively.

The exhaust air from the triple valve must now pass through the inlet opening 35 and impinge against the lower piston 24, and it is thus retained. Of course the valve 34 is in the position shown in Fig. 9 when the device is in operative position.

At this point, it can also be seen that the air in the line 16 after lifting the piston 38 will pass through the pocket 54, by-pass 50 to the extension 43 and continues along the line 16 to the next retaining valve. Thus it can be seen that these valves operate successively and not simultaneously.

The retaining valves thus being set to retain the exhaust air, a releasement of this air will consequently result in the operation first of the valve on the first car of the train. This results in the releasement of the air from the triple valve in the following manner.

As the air pressure against the piston 38 diminishes, the same will be lowered by the spring 40 and result in the separation of the needle valve 39 from the tube 22, connecting the pistons 23 and 24. This permits the trapped air below piston 24 to escape through the tube 22 and through the apertured plug 30 to the atmosphere. This function is very simple and takes place successively in each of the retaining valves, so that there is no sudden releasement of the brakes. A dome-shaped cover 8' is connected with the plate 28' and this cover is formed with an exhaust port 9' so that the air passing through the bore of the plug 30 will flow into the space formed by this cover and then pass therefrom thru the port 9'.

An important feature of the invention resides in the provision of a safety valve for the retaining valve. The safety valve only operates when something defective occurs in the corresponding retaining valve. Should something occur to the piston 38 so that the same will not rise, the pressure of the air in line 16 against the valve 47 will uncover the same from the opening 51a and permit the air to pass directly into the tubular extension 43. Thus, the particular retaining valve is eliminated from the system.

The valves 53 and 57 are shut-off valves, and these valves and the valves 34 act to render the device inoperative whenever desired or necessary.

It can be seen that various other important features predominate in the construction of braces of the device which will promote the efficiency of the mechanism in practice.

While the foregoing specification sets forth the invention in specific terms, it is to be understood that numerous changes in the shape, size and materials may be resorted to without departing from the spirit and scope of the invention as claimed hereinafter.

Having thus described our invention, what we claim as new is:—

1. A retaining valve for air brakes comprising a cylinder having, an upper and a lower exhaust air inlet therein, and an upper exhaust air outlet therein, a piston unit operative between the pair of exhaust air inlets, and provided with a duct extending therethrough, the top of the cylinder having an additional air outlet therein registrable with the duct in the unit, and a fluid operative needle valve engageable against the bottom of the unit for closing the duct at its lower end.

2. A retaining valve for air brakes comprising a cylinder having, an upper and a lower exhaust air inlet therein, and an upper exhaust air outlet therein, a piston unit operative between the pair of exhaust air inlets, provided with a duct extending therethrough the top of the cylinder having an additional air outlet therein registrable with the duct in the unit, a fluid operative needle valve engageable against the bottom of the unit for closing the duct at its lower end, said fluid operative needle valve including a piston valve thereon, and compressed air means for operating the said piston valve.

3. A retaining valve for air brakes comprising a cylinder having, an upper and a lower exhaust air inlet therein, and an upper exhaust air outlet therein, a piston unit operative between the pair of exhaust air inlets, provided with a duct extending therethru, the top of the cylinder having an additional air outlet therein registrable with the duct in the unit, a fluid operative needle valve engageable against the bottom of the unit for closing the duct at its lower end, said fluid operative needle valve including a piston valve thereon compressed air means for operating the said piston valve including, an air inlet and an air outlet, and a safety valve interposed between the air inlet and outlet for by-passing the retaining valve when the same becomes defective.

4. A retaining valve for air brakes comprising a cylinder having inlet and outlet ports in the upper part, and an inlet port in an intermediate portion, a pair of piston valves, a tubular stem connecting the valves together, the top of the cylinder having a discharge vent in alinement with the bore of the stem, spring means for normally holding the piston valves in a position, with the upper inlet and exhaust port in communication with each other, and the lower inlet port closed, a third piston valve in the cylinder, a needle valve carried thereby, fluid means for raising the third piston valve to cause the needle valve to raise the first-mentioned piston valve and to close the bore of the stem, whereby the upper piston valve closes the upper inlet and exhaust ports and the piston valve connected therewith by the stem, opens the second inlet port, spring means for normally holding the third piston valve in lowered position, and said needle valve opening the bore of the valve stem when the third piston valve moves downwardly to permit the air entering the lower inlet port to pass through the hollow stem and escape from the vent in the top of the cylinder.

In testimony whereof we affix our signatures.

MICHAEL J. FARRELL.
LALLY STAFFARONI.